(12) United States Patent
Chan et al.

(10) Patent No.: US 12,235,374 B2
(45) Date of Patent: Feb. 25, 2025

(54) RANGING-TYPE POSITIONING SYSTEM AND RANGING-TYPE POSITIONING METHOD BASED ON CROWDSOURCED CALIBRATION

(71) Applicant: PSJ INTERNATIONAL LTD., Tortola (VG)

(72) Inventors: Hao-Wei Chan, Taichung (TW); Alexander I Chi Lai, Taipei (TW); Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 534 days.

(21) Appl. No.: 17/826,119

(22) Filed: May 26, 2022

(65) Prior Publication Data

US 2023/0114585 A1 Apr. 13, 2023

(30) Foreign Application Priority Data

Oct. 13, 2021 (TW) ................................. 110137888

(51) Int. Cl.
*G01S 5/02* (2010.01)
*G01S 7/00* (2006.01)
(Continued)

(52) U.S. Cl.
CPC ........ *G01S 5/0264* (2020.05); *G01S 5/02526* (2020.05); *H04W 4/021* (2013.01); *H04W 4/025* (2013.01)

(58) Field of Classification Search
CPC .... G01S 13/72; G01S 13/765; G01S 2205/02; G01S 5/0218; G01S 5/02526;
(Continued)

(56) References Cited

U.S. PATENT DOCUMENTS 9,046,591 B1 *   6/2015  Yang .................... G01C 21/005
2004/0127228 A1  7/2004  You et al.
(Continued)

FOREIGN PATENT DOCUMENTS

CN     101873607 A    10/2010
CN     107094319 A    8/2017
(Continued)

*Primary Examiner* — Asghar H Bilgrami
(74) *Attorney, Agent, or Firm* — Li & Cai Intellectual Property Office (57) ABSTRACT

A ranging-type positioning system and a ranging-type positioning method based on crowdsourced calibration are provided. In a crowdsourcing stage, pedestrian dead reckoning (PDR) is performed based on readings of inertial measurement units on a mobile device, a particle filter (PF) is executed to reconstruct a path of the mobile device with map information of the target field, and FTM data records are collected. Then, a ranging model based on a neural network can be used to calibrate and inversely infer approximate locations of unknown base stations. The optimized ranging model can estimate estimated distances and standard deviations based on the FTM data records obtained in the crowdsourcing stage. In a positioning stage, a position of a to-be-positioned mobile device can be positioned by having the ranging model operated in cooperation with the PDR and the PF.

11 Claims, 6 Drawing Sheets

(51) Int. Cl.
*G01S 13/72* (2006.01)
*G01S 13/76* (2006.01)
*H04W 4/02* (2018.01)
*H04W 4/021* (2018.01)

(58) Field of Classification Search
CPC .... G01S 5/0264; G01S 5/0269; G01S 5/0278; G01S 7/006; H04W 4/021; H04W 4/025
See application file for complete search history.

(56) References Cited

U.S. PATENT DOCUMENTS

2019/0104493 A1* 4/2019 Hedley ................ G01S 5/0294
2021/0381849 A1* 12/2021 Aviel ................ G01C 21/3837

FOREIGN PATENT DOCUMENTS

| CN | 112333818 A | 2/2021 |
| TW | 201031243 A1 | 8/2010 |
| TW | 201042279 A1 | 12/2010 |

* cited by examiner

RANGING-TYPE POSITIONING SYSTEM AND RANGING-TYPE POSITIONING METHOD BASED ON CROWDSOURCED CALIBRATION

CROSS-REFERENCE TO RELATED PATENT APPLICATION

This application claims the benefit of priority to Taiwan Patent Application No. 110137888, filed on Oct. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a positioning system and a positioning method, and more particularly to a ranging-type positioning system and a ranging-type positioning method based on crowdsourced calibration.

BACKGROUND OF THE DISCLOSURE

Having foreseen the rapid growth of demand for indoor positioning, the IEEE 802.11mc standard introduced an improved Wi-Fi time of arrival (TOA) protocol called Fine Timing Measurement (FTM). By exchanging FTM frames between an FTM initiator (FTMI) and an FTM responder (FTMR), a round trip time (RTT) between Wi-Fi devices can be measured. Since the FTM is able to reach a time resolution of a few nanoseconds, sub-meter level ranging accuracy can ideally be achieved. However, Wi-Fi FTM still needs to overcome challenges of erroneous range estimation from, for example, device offset and non-line-of-sight (NLOS) reception.

That is to say, all FTM base stations (presumably in the FTMR mode) need to be pre-calibrated and anchored at stationary locations or "ground truths", and are thus easily affected by environmental disturbances.

SUMMARY OF THE DISCLOSURE

In response to the above-referenced technical inadequacies, the present disclosure provides a ranging-type positioning system and a ranging-type positioning method based on crowdsourced calibration.

In one aspect, the present disclosure provides a ranging-type positioning method based on crowdsourced calibration, which includes: arranging a plurality of base stations in a target field; configuring a mobile device to move in the target field for obtaining direction information and step length information during a movement of the mobile device, and configuring the mobile device to communicate with the plurality of base stations for collecting a plurality of measurement data records related to the plurality of base stations during the movement; configuring a computing device to: calculate, according to the plurality of measurement data records, a plurality of measurement distances and a plurality of measurement parameters related to the plurality of measurement distances; obtain map information of the target field, in which the map information includes at least one reference coordinate of at least one reference base station among the plurality of base stations; execute a particle filter for obtaining a forward path, a backward path and a replay path according to the map information, the direction information and the step length information; combine the backward path and the replay path for generating a mixed path; and perform an optimization process on a ranging model, so as to minimize a distance loss and a geometric loss with respect to one of a plurality of estimated distances generated by the ranging model. The ranging model includes an offset compensation module and a non-line of sight (NLOS) estimation module. The offset compensation module is configured to process the plurality of measurement distances through a first activation function and generate a plurality of offset compensation distances, and the plurality of offset compensation distances are respectively used to eliminate a plurality of offset errors of the plurality of measurement distances. The NLOS estimation module is configured to, by using a neural network, take the plurality of offset compensation distances and the plurality of measurement parameters as inputs and estimate a plurality of corrected distances, in which the plurality of corrected distances are used to eliminate a plurality of position-dependent errors caused by NLOS in the plurality of measurement distances. The distance loss is a sum of differences respectively between the plurality of measurement distances related to the at least one reference base station and a plurality of true distances, and the plurality of true distances are distances between coordinates on the mixed path and the at least one reference coordinate in response to the plurality of measurement distances being obtained. The geometric loss is a sum of differences respectively between the plurality of measurement distances and a plurality of due distances, and the plurality of due distances are distances respectively between the coordinates on the mixed path and a plurality of to-be-optimized estimated coordinates of the plurality of base stations in response to the plurality of measurement distances being obtained. The ranging-type positioning method further includes: configuring the computing device to generate, in response to the ranging model being optimized by the optimization process, the plurality of estimated distances, calculate a plurality of estimated coordinates of the base stations according to the plurality of estimated distances, and take the optimized ranging model as a positioning model; configuring a to-be-positioned mobile device to move in the target field, to obtain positioning direction information and positioning step length information during a movement of the to-be-positioned mobile device, and to communicate with the plurality of base stations for collecting a plurality of positioning measurement data records related to the plurality of base stations during the movement; and configuring the computing device to: calculate, according to the plurality of positioning measurement data records, a plurality of positioning measurement distances and a plurality of positioning measurement parameters related to the plurality of positioning measurement distances; input the plurality of positioning measurement distances and the plurality of positioning measurement parameters into the positioning model, so as to generate a plurality of positioning estimated distances; and execute, according to the map information, the positioning direction information, the positioning step length information, the estimated coordinates and the positioning estimated distances, the particle filter to obtain a position of the to-be-positioned mobile device in the target field.

In another aspect, the present disclosure provides a ranging-type positioning system based on crowdsourced calibration, which includes a plurality of base stations, a mobile device, a computing device, and a to-be-positioned mobile device. The plurality of base stations are arranged in a target field. The mobile device is configured to move in the target field, so as to obtain direction information and step length information during a movement of the mobile device. The mobile device is configured to communicate with the plurality of base stations for collecting a plurality of measurement data records related to the plurality of base stations during the movement. The computing device is configured to: calculate, according to the plurality of measurement data records, a plurality of measurement distances and a plurality of measurement parameters related to the plurality of measurement distances; obtain map information of the target field, in which the map information includes at least one reference coordinate of at least one reference base station among the plurality of base stations; execute a particle filter for obtaining a forward path, a backward path and a replay path according to the map information, the direction information and the step length information; combine the backward path and the replay path for generating a mixed path; and perform an optimization process on a ranging model, so as to minimize a distance loss and a geometric loss with respect to one of a plurality of estimated distances generated by the ranging model. The ranging model includes an offset compensation module and a non-line of sight (NLOS) estimation module. The offset compensation module is configured to process the plurality of measurement distances through a first activation function and generate a plurality of offset compensation distances, and the plurality of offset compensation distances are used to eliminate a plurality of offset errors of the plurality of measurement distances, respectively. The NLOS estimation module is configured to, by using a neural network, take the plurality of offset compensation distances and the plurality of measurement parameters as inputs, and estimate a plurality of corrected distances. The plurality of corrected distances are used to eliminate a plurality of position-dependent errors caused by NLOS in the plurality of measurement distances. The distance loss is a sum of differences respectively between the plurality of measurement distances related to the at least one reference base station and a plurality of true distances, and the plurality of true distances are distances between coordinates on the mixed path and the at least one reference coordinate in response to the plurality of measurement distances being obtained. The geometric loss is a sum of differences respectively between the plurality of measurement distances and a plurality of due distances, and the plurality of due distances are distances respectively between the coordinates on the mixed path and a plurality of to-be-optimized estimated coordinates of the plurality of base stations. The computing device is further configured to generate, in response to the ranging model being optimized by the optimization process, the plurality of estimated distances, calculate a plurality of estimated coordinates of the base stations according to the plurality of estimated distances, and the optimized ranging model is taken as a positioning model. The to-be-positioned mobile device is configured to move in the target field, so as to obtain positioning direction information and positioning step length information during a movement of the to-be-positioned mobile device. In addition, the to-be-positioned mobile device is configured to communicate with the plurality of base stations to collect a plurality of positioning measurement data records related to the plurality of base stations during the movement. The computing device is further configured to: calculate a plurality of positioning measurement distances and a plurality of positioning measurement parameters related to the plurality of positioning measurement distances according to the plurality of positioning measurement data records; input the plurality of positioning measurement distances and the plurality of positioning measurement parameters into the positioning model to generate a plurality of positioning estimated distances; and execute the particle filter to obtain a position of the to-be-positioned mobile device in the target field according to the map information, the positioning direction data, the positioning step length data, the estimated coordinates and the positioning estimated distances.

Therefore, in the ranging-type positioning system and the ranging-type positioning method based on crowdsourced calibration provided by the present disclosure, pedestrian dead reckoning (PDR) can be performed based on readings of inertial measurement units on the mobile device, the particle filter (PF) can be executed to reconstruct a path of the mobile device with the map information of the target field, and FTM data records are collected. Then, the ranging model based on the neural network can be used to calibrate and inversely infer approximate locations of unknown base stations. The optimized ranging model can estimate the estimated distances and standard deviations based on the FTM data records obtained in a crowdsourcing stage. In a positioning stage, a position of the to-be-positioned mobile device can be positioned by having the ranging model operated in cooperation with the PDR and the PF. Therefore, based on superior time resolution and ranging accuracy of FTM, ranging positioning can be realized.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Crowdsourcing has promising prospects with respect to calibration and measurement. In the present disclosure, mobile devices or smartphones are used as an FTMI due to their wide availability. That is, each smartphone user may potentially contribute to the collection and analysis of perceived signal information, particularly FTM readings mentioned in the present disclosure. In the present disclosure, an inverse inference is made to obtain approximate locations of stationary base stations (that function as an FTMR) through the crowdsourced FTM readings. Accordingly, based on superior time resolution and ranging accuracy of FTM, ranging positioning can be realized.

To address the aforementioned calibration and measurement issues, the present disclosure proposes a multi-source fusion positioning system that combines the crowdsourced FTM readings and pedestrian dead reckoning (PDR).

Figure 1:
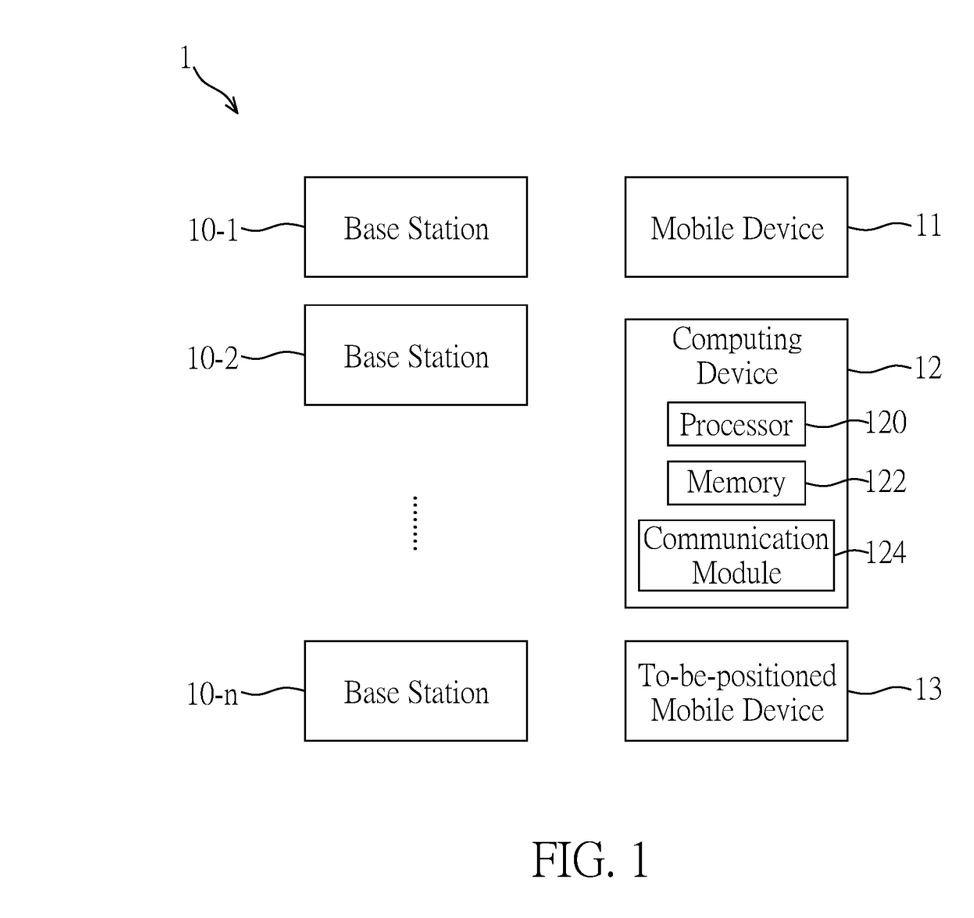
FIG. 1 is a block diagram of a ranging-type positioning system according to one embodiment of the present disclosure.

Reference is made to FIG. 1, which is a block diagram of a ranging-type positioning system according to one embodiment of the present disclosure. As shown in FIG. 1, a ranging-type positioning system 1 includes a plurality of base stations 10-1, 10-2, ..., 10-n, a mobile device 11, a computing device 12, and a to-be-positioned mobile device 13.

The base stations 10-1, 10-2, ..., 10-n can be Wi-Fi access points that support the IEEE 802.11mc standard, and support the fine time measurement (FTM) protocol. The base stations 10-1, 10-2, ..., 10-n can be arranged in a target field that is scheduled to perform positioning.

The mobile device 11 can be a smartphone equipped with a plurality of inertial measurement units (IMUs), and the IMUs can include accelerometers, gyroscopes, and magnetometers. Similarly, the to-be-positioned mobile device 13 can also be a smart phone equipped with multiple IMUs, and the mobile device 11 can also be used as the to-be-positioned mobile device 13. However, the above description is only an example, and the present disclosure is not limited thereto. The mobile device 11 and the to-be-positioned mobile device 13 are each equipped with at least a processor, a memory, and a wireless communication module that supports the IEEE 802.11mc standard, and support the FTM protocol.

The computing device 12 can at least include a processor 120, a memory 122, and a communication module 124. The computing device may be, for example, a general-purpose computer or a server.

The processing circuit 120 can be, for example, a central processing unit (CPU), a programmable general-purpose or special-purpose microprocessor (Microprocessor), a digital signal processor (DSP), a programmable controller, an application specific integrated circuit (ASIC), a programmable logic device (PLD), a graphics processing unit (GPU), or any other similar device or a combination of these devices.

The memory 122 can be used to store images, program codes, software modules, and other data. The memory 122 can be, for example, any type of a fixed or removable random access memory (RAM), a read-only memory (ROM), flash memory, a hard disk, or any other similar device, integrated circuit and a combination thereof.

The communication module 124 can be, for example, a wireless communication module that supports various short-distance or long-distance communications (such as a wireless communication module that supports Wi-Fi, Bluetooth and other specifications). The communication module 124 can also be a wired communication module, such as a network card supporting an Ethernet interface. The communication module 124 is mainly used to communicate with the mobile device 11 and/or the to-be-positioned mobile device 13.

Figure 2:
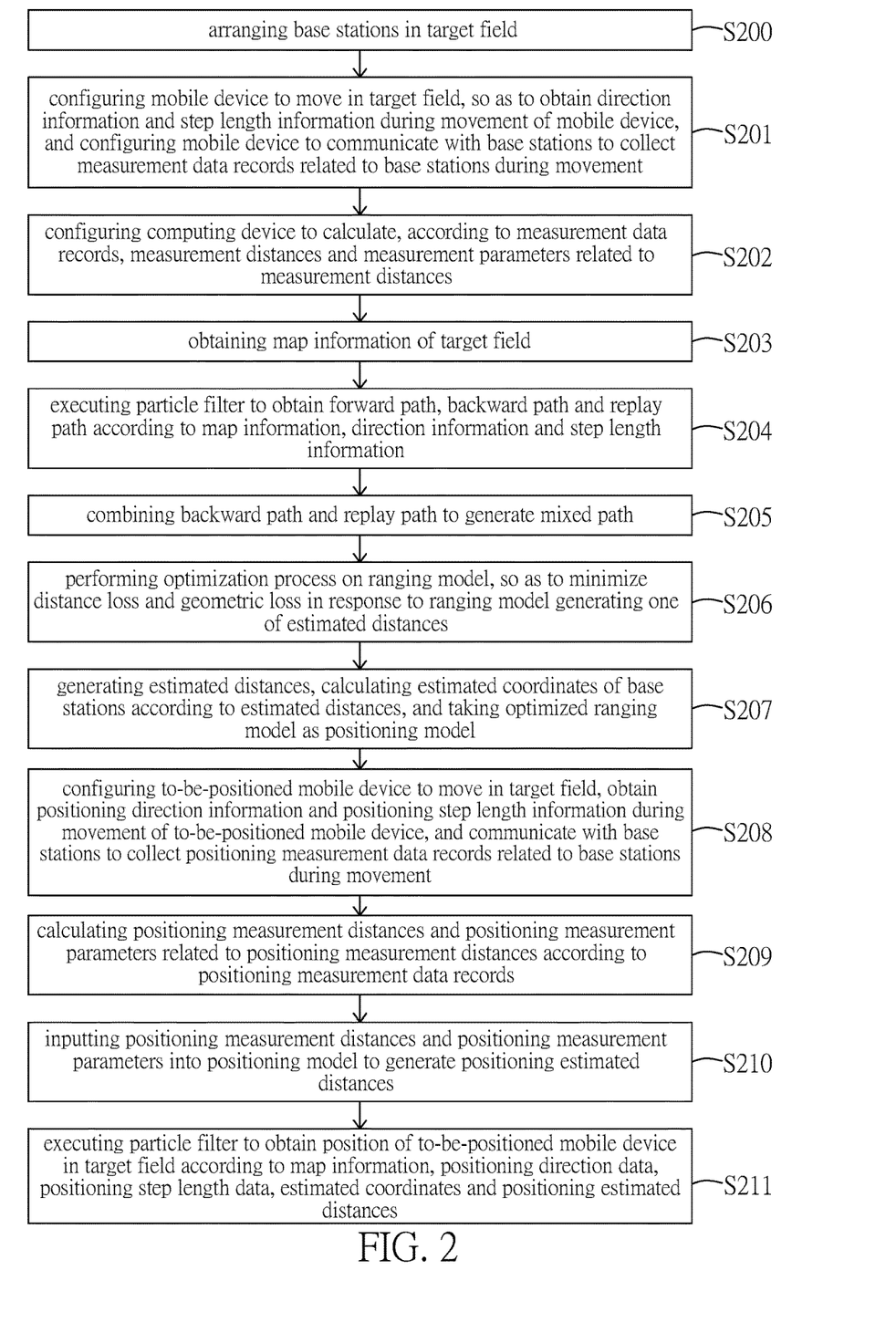
FIG. 2 is a flowchart of a ranging-type positioning method according to one embodiment of the present disclosure.

Reference is made to FIG. 2, which is a flowchart of a ranging-type positioning method according to one embodiment of the present disclosure. Hereinafter, the ranging-type positioning method based on crowdsourced calibration provided in the present disclosure will be explained with reference to FIG. 2, and can be applied to the aforementioned ranging-type positioning system, but the present disclosure is not limited thereto. The ranging-type positioning method includes the following steps.

Step S200: arranging a plurality of base stations in a target field. For example, the mobile device 11 can be carried by a user, so as to move in the target field along a predetermined route.

Step S201: configuring the mobile device to move in the target field, so as to obtain direction information and step length information during a movement of the mobile device, and configuring the mobile device to communicate with the plurality of base stations to collect a plurality of measurement data records related to the plurality of base stations during the movement.

In detail, the computing device 12 can obtain movement information of the mobile device 11 from the IMUs of the mobile device 11, and obtain the direction information and the step length information during the movement by pedestrian dead reckoning (PDR).

The mobile device 11 is usually equipped with the inertial measurement units (IMUs), which include accelerometers, magnetometers, and gyroscopes. The mobile device 11 can obtain a relative direction from the gyroscope or an absolute direction from the magnetometer.

The mechanism of human walking involves many complex processes, which include stages such as stepping on the ground and raising legs. There are many ways to attach a sensor to the foot and estimate a step length through the swing of the foot. For example, in the present disclosure, a peak detection method is used to detect step events and calculate the step length accordingly.

On the other hand, the IEEE 802.11mc standard supports a round trip time (RTT) measurement of Wi-Fi devices, so as to estimate a distance between the Wi-Fi devices through the FTM protocol. An FTM initiator (FTMI), such as a mobile phone or a portable computer, initiates the FTM protocol by sending an FTM request to another FTM-enabled device. Then, the device (mainly Wi-Fi access points) that receives this FTM packet is called an FTM responder (FTMR), and will return an acknowledgement (ACK) message.

Therefore, in step S201, the mobile device 11 can be used as an FTMI, the Wi-Fi access points can be used as multiple FTMRs, and the FTMI and each one of the FTMRs communicate with each other, so as to activate the FTM protocol and collect a plurality of FTM data records, that are taken as the plurality of measurement data records, from the plurality of Wi-Fi access points during the movement of the mobile device 11.

Step S202: configuring the computing device to calculate, according to the plurality of measurement data records, a plurality of measurement distances and a plurality of measurement parameters related to the plurality of measurement distances.

In detail, after a certain amount of the FTM data records are received for several times, a round trip time (RTT) can be calculated, and a RTT distance $d_{FTM}$ can be obtained by multiplying the RTT to the speed of light. In this step, the computing device 12 can calculate, according to the plurality of FTM data records, a plurality of FTM distances and the plurality of measurement parameters of the Wi-Fi access points measured by the mobile device 11 during the movement. The plurality of measurement parameters include a plurality of distance standard deviations and a plurality of signal strengths.

In other words, in addition to the average RTT distance, a distance standard deviation $s_{FTM}$ and a received signal strength indicator (RSSI) $r_{FTM}$ can also be calculated based on the FTM data records of one FTM.

Generally, if the FTM is conducted in a clear line of sight, an error of a distance measurement will be within 1 m to 2 m. However, since the FTM is like most TOA protocols and needs to exchange data packets, signals penetrating obstacles or being reflected by the obstacles can easily affect the quality of ranging. A relationship between the measured FTM distance and a true distance can be expressed as:

$$d^{FTM} = \|z_I - z_R\| + d^{err};$$

where $Z_I$ and $Z_R$ are true position vectors for the FTMI and the FTMR, and $\|z_I - z_R\|$ is the true distance between two devices. In addition, $d^{err}$ is an error, which is defined as having three components ($d^{err} = d^{ofs} + d^{pos} + d^m$). Here, $d^{ofs}$ is an offset error, $d^{pos}$ is a position-related error, and $d^m$ is a measurement error.

The offset error $d^{ofs}$ can be caused by a channel, types of the initiator and types of the responder, the position-dependent error $d^{pos}$ can be affected by NLOS conditions between the FTMI and the FTMR, and the measurement error $d^m$ can be affected by an uncertainty principle and other non-linear factors.

Step S203: obtaining map information of the target field. In detail, the map information can be drawn and coordinates can be defined according to a structure of the target field. For example, if the target field is an indoor environment inside a building, multiple wall structures in the target field can be used to define an accessible area and an inaccessible area.

In addition, in the ranging-type positioning method of the present disclosure, a final positioning result can still be obtained with a certain accuracy when coordinates of only one of the base stations can be known (which will be described later on). It should be noted that in the map information, a base station with known coordinates can be taken as a reference base station, and the coordinates of the reference base station can be marked as a reference coordinate in a map.

Next, the computing device 12 is configured to perform the following steps.

Step S204: executing a particle filter to obtain a forward path, a backward path and a replay path according to the map information, the direction information and the step length information.

The particle filter (PF) is a Bayesian nonlinear filtering method that is used to approach a posterior probability density function of a system state.

According to the PDR mechanism, a state transition model of the PF can be derived as:

$$\begin{bmatrix} x_k^i \\ y_k^i \end{bmatrix} = \begin{bmatrix} x_{k-1}^i \\ y_{k-1}^i \end{bmatrix} + \begin{bmatrix} (SL_k + \delta_{SL})\cos(\theta_k + \delta_\theta) \\ (SL_k + \delta_{SL})\sin(\theta_k + \delta_\theta) \end{bmatrix};$$

where $x_k^i$ and $y_k^i$ are updated state vectors, $x_{k-1}^i$ and $y_{k-1}^i$ are previous estimation outputs, $SL_k$ and $\theta_k$ are the step lengths of a detected state, and $\delta_{SL}$ and $\delta_\theta$ respectively represent uncertainties of the step length and heading. For example, a random error uniformly distributed in the range of ±10% of the step length and ±20 degree of the heading will be added as $\delta_{SL}$ and $\delta_\theta$.

After each update, particles in the target field are tested by the following manner, so as to determine whether the particles violate any wall constraints:

$$w_k^i = \begin{cases} w_k^i, & \text{accessible area} \\ 0, & \text{inaccessible area} \end{cases};$$

where $w_k^i$ is a weight of an i-th particle defined by a Monte Carlo (MC) method. Then, after each step, the PF will normalize the weight of the particles by the following manner $$\tilde{w}_k^i = \frac{w_k^i}{\sum_{k=1}^N w_k^i}.$$

After the data is collected, the PDR and the PF are combined to provide a location label that is used to calibrate the FTMR measurement. After the mobile device 11 completes its movement in the target field according to the predetermined route, three processes are used to obtain positions of the mobile device 11 along the route.

Figure 3:
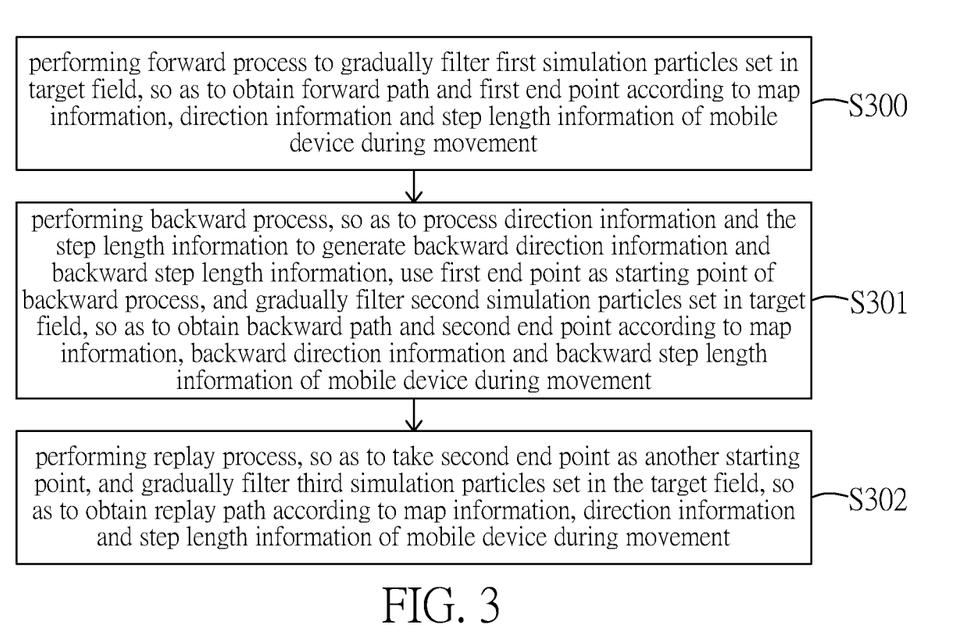
FIG. 3 is a detailed flowchart of step S204 according to one embodiment of the present disclosure.

Reference is made to FIG. 3, which is a detailed flowchart of step S204 according to one embodiment of the present disclosure.

Step S204 can include configuring the computing device 12 to execute the PF, so as to carry out the following steps.

Step S300: performing a forward process to gradually filter a plurality of first simulation particles set in the target field, so as to obtain the forward path and a first end point according to the map information, the direction information and the step length information of the mobile device during the movement.

In detail, at a given step k in a path with a total K steps, the position of the mobile device 11 is defined as a weighted average of the particles:

$$X_k = \sum_{i=1}^{N} \tilde{w}_k^i X_k^i;$$

where $X_k=(x_k, y_k)$, and weighted variances of the particles are:

$$s_k^2 = \sum_{i=1}^{N} \tilde{w}_k^i \|X_k^i - X_k\|^2.$$

Figure 4A:
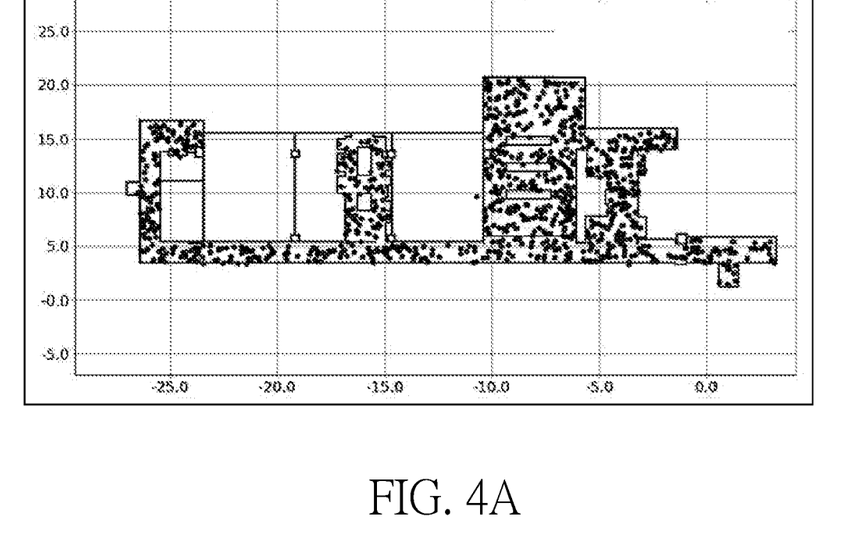
FIGS. 4A and 4B are respectively first and second schematic diagrams showing executions of a particle filter according to one embodiment of the present disclosure.
Figure 4B:
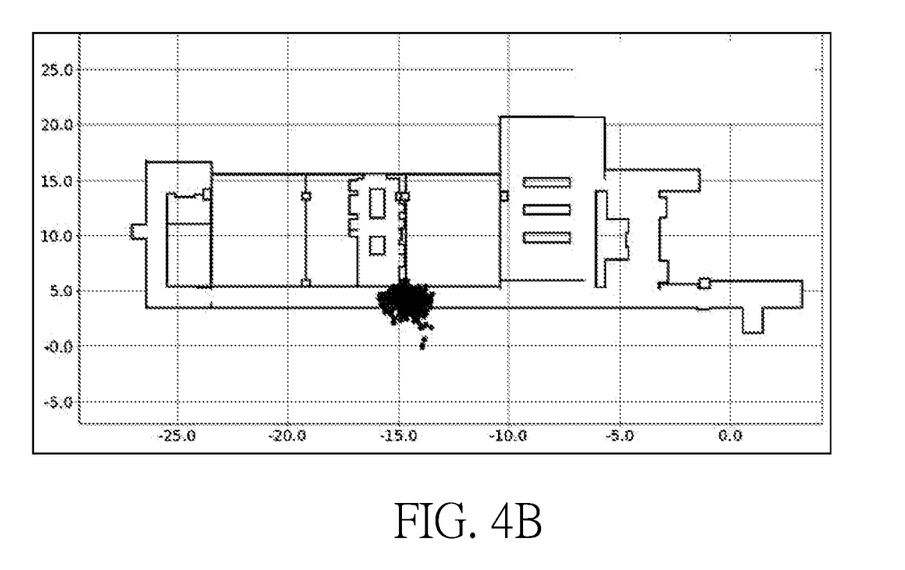

Further reference can be made to FIGS. 4A and 4B, in which FIGS. 4A and 4B are respectively first and second schematic diagrams showing executions of a particle filter according to one embodiment of the present disclosure. In FIGS. 4A and 4B, a vertical axis represents Y coordinate, a horizontal axis represents X coordinate, and the unit is, for example, meters. Initially, when the user is walking in the target field, the system cannot know where the user is because the FTM has not yet been able to provide an absolute location of the user. Therefore, in the forward process, the particles are evenly distributed in all areas of the target field at the beginning (as shown in FIG. 4A). In other words, if the particle i is in the accessible area, $w_0^i=1/N$. If the particle i is in the inaccessible area, then $w_0^i$ is 0.

When the user walks arbitrarily in the target field, the particles follow the update of the PDR and the screening of the map information. All particles in locations that are impossible to reach will be eliminated, and the remaining particles will be concentrated in a relatively small area that has the mobile device 11 located at its center (as shown in FIG. 4B). For at least one step, the variance of the particles needs to be lower than a threshold $s_{thresh}^2$ for at least one of the steps, such that this path will be saved as valid data.

Assuming that step $K_f$ is the largest k value in [1,K], the variance of the particles satisfies:

$$S_{K_f}^2 < S_{thresh}.$$

The particles at step $K_f$ are inherited in a subsequent backward process, and the steps from $K_f+1$ to K are discarded. If the k value satisfies none of the above conditions, then this forward path is not used.

Step S301: performing the backward process, so as to process the direction information and the step length information to generate backward direction information and backward step length information, use the first end point as a starting point of the backward process, and gradually filter a plurality of second simulation particles set in the target field, so as to obtain the backward path and a second end point according to the map information, the backward direction information and the backward step length information of the mobile device during the movement.

In detail, in the backward process, the converged particles inherited from the forward process at the step $K_f$ will again run an update procedure of the PF (but in the opposite direction $\tilde{\theta}_k^i$), such that $\tilde{\theta}_k^i=\theta_k^i+\pi$.

In this way, the past position of the user can be obtained. The backward process runs from step $K_f$ to step 1. Likewise, the smallest step within step [1, $K_f$] is step $K_b$, and $S_{k_b}^2 < S_{thresh}^2$.

The particles at step [1, $K_b$] are to be discarded, and only steps from [$K_b$, $K_f$] are applied in a final replay process.

Step S302: performing the replay process, so as to take the second end point as another starting point, and gradually filter a plurality of third simulation particles set in the target field, so as to obtain the replay path according to the map information, the direction information and the step length information of the mobile device during the movement.

In the backward process, the location of the mobile device 11 can already be obtained. However, during the backward process, there may still be a relatively high standard deviation of particle distribution at certain positions, which means that there is still insufficient confidence in the true position of the mobile device 11. Since these inferred positions will be used to calibrate the FTMR, a more accurate position is desired, so as to avoid compromising the accuracy of an FTMR calibration process.

Therefore, the replay process inherits the particles at step K b in the backward process, and then runs each step in the forward process again, so as to generate another path as the replay path.

At this point, two similar path positions can be obtained from the backward process and the replay process.

Referring to FIG. 2 again, the ranging-type positioning method proceeds to using the computing device 12 to execute step S205, which is: combining the backward path and the replay path to generate a mixed path.

In this step, the computing device 12 can perform an inverse-variance weighting method to combine the backward path and the replay path, so as to generate the mixed path for providing accurate location information. The mixed path defines a plurality of path coordinates in the map information at each step of the mobile device during the movement.

Figure 5:
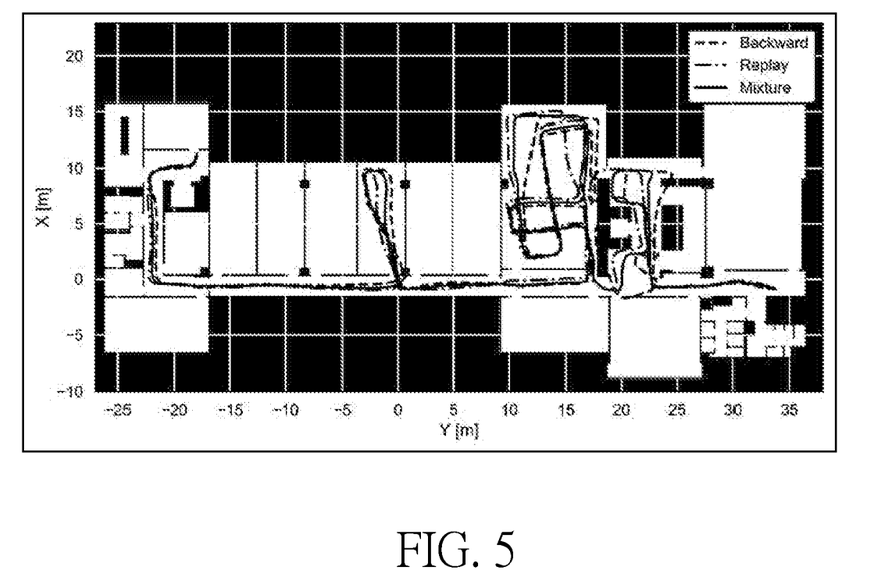
FIG. 5 is a schematic diagram showing a backward path, a replay path, and a mixed path in a target field according to one embodiment of the present disclosure.

FIG. 5 is a schematic diagram showing a backward path, a replay path, and a mixed path in a target field according to one embodiment of the present disclosure. As shown in FIG. 5, the mixed path (labeled as Mixture) that is finally used as a coordinate label is a mixture of the backward path (labeled as Backward) and the replay path (labeled as Replay). The mean and the variance of each path can be calculated as follows:

$$\tilde{X}_k = \frac{w_{k,b} X_{k,b} + w_{k,r} X_{k,r}}{w_{k,b} + w_{k,r}};$$

$$\tilde{s}_k^2 = \frac{w_{k,b}(X_{k,b}^2 + s_{k,b}^2) + w_{k,r}(X_{k,r}^2 + s_{k,r}^2)}{w_{k,b} + w_{k,r}};$$

where $w_{k,b}=1/S_{k,b}^2$ and $w_{k,r}=1/S_{k,r}^2$.

The variance of the coordinates on the path is an indicator of the confidence of convergence. The smaller the variance is, the smaller an error between an estimated path and a true path should be. Further, the backward path, the replay path, and the mixed path have relatively small variances compared with the variance of the forward path.

It should be noted that steps S200 to S205 are referred to as a crowdsourcing stage in the present disclosure. In the crowdsourcing stage, the PF and the PDR are used, a path of the mobile device is reconstruct based on readings of the inertial measurement units on the mobile device and the map information of the target field, and the FTM data records are collected.

Step S206: performing an optimization process on a ranging model, so as to minimize a distance loss and a geometric loss in response to the ranging model generating one of a plurality of estimated distances.

In detail, in order to produce reliable ranging results, the above-mentioned errors (including the offset error, the position-dependent error, and the measurement error) need to be eliminated.

In one embodiment of the present disclosure, all noises of the FTMR are combined into a ranging model. Accordingly, after the ranging model is optimized, the ranging model can provide reliable distance predictions for all the FTMRs in the target field. The ranging model is designed to produce the estimated distance and its standard deviation from the input data.

An input-output relationship of the ranging model is expressed as a parameterized function as follows:

$$[\hat{d},\hat{s}]=R(x;\Theta);$$

where $\hat{d}$ and $\hat{s}$ are the distance prediction and the standard deviation.

$x_j=[d_j^{FTM}; s_j^{FTM}; r_j^{FTM}]^1$ is the combination of all data from FTM packets of j-th FTMR, which represents FTM distance, distance standard deviation and RSSI, respectively. In addition, $\Theta$ is a training parameter of the ranging model.

Figure 6:
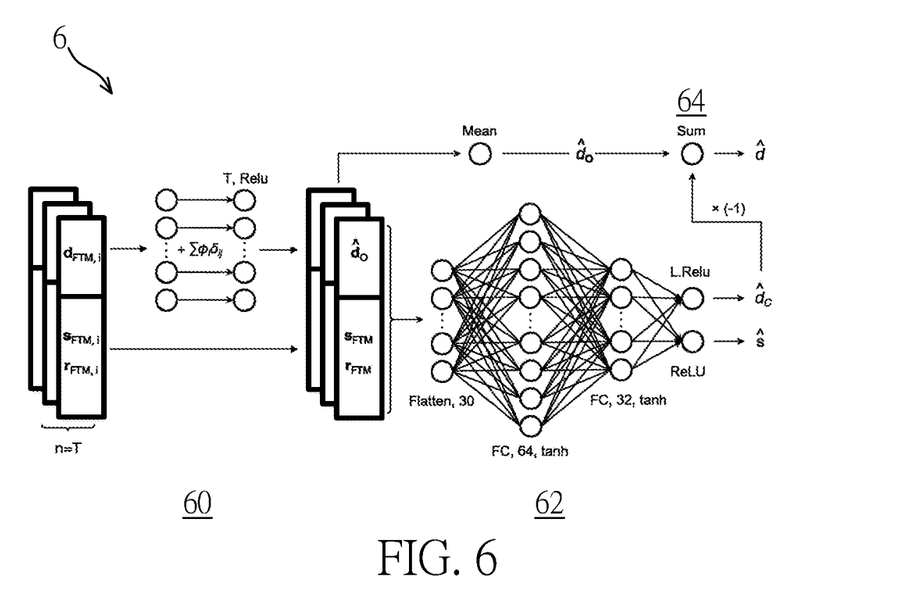
FIG. 6 is an architecture diagram of a ranging model according to one embodiment of the present disclosure.

Reference is further made to FIG. 6, which is an architecture diagram of a ranging model according to one embodiment of the present disclosure. The input of a ranging model 6 is the time series data of T consecutive FTM samples, which is expected to eliminate the randomness in the measurement noise.

The ranging model 6 includes an offset compensation module 60 and a non-line of sight (NLOS) estimation module 62. The ranging model 6 considers all T samples (labeled as the number of samples n=T) of the plurality of FTM data records, and only outputs two numbers: the distance prediction $\hat{d}$ and the standard deviation $\hat{s}$.

As shown in FIG. 6, the offset compensation module 60 is configured to process the measurement distances through a first activation function (i.e., a rectified linear unit (ReLU) function in the present embodiment), and generate a plurality of offset compensation distances for respectively eliminating a plurality of offset errors of the measurement distances.

In more detail, the offset compensation module 60 takes the plurality of FTM distances as inputs, adds a plurality of offset variables respectively to the plurality of FTM distances, and uses the ReLU activation function to calculate, so as to generate the plurality of offset compensation distances, which are used to eliminate the plurality of offset errors of the plurality of FTM distances.

It can be seen from the left side of FIG. 6 that the ranging model 6 first performs offset compensation. To compensate for the offset deviation of the FTM distance, the offset variable is added to the measured FTM distance $d_i^{FTM}$ (labeled as $d_{FTM,i}$ in FIG. 6) as:

$$\hat{d}^o = ReLU\left(d_i^{FTM} + \sum_{j=1}^{J}\hat{\phi}_j \delta_{ij}\right);$$

where $\hat{d}^o$ is the offset compensation distance (labeled as $\hat{d}_o$ in FIG. 6), and $\phi_j$ is the offset variable of the j-th FTMR. Assuming that there are J FTMRs in the field, the Kronecker delta function $\delta ij$ means that only the offset variable $\hat{\phi}_i$ will be added to $d_i^{FTM}$.

The rectified linear unit (ReLU) function ReLU(x)=max (0, x) can ensure that the output is always positive since a distance between two nodes is positive.

By using a neural network, the NLOS estimation module 62 is configured to take the offset compensation distance $\hat{d}^o$ and the measurement parameters ($S_{FTM}$ and $r_{FTM}$) as inputs and estimate a plurality of corrected distances, in which the plurality of corrected distances are used to eliminate a plurality of position-dependent errors caused by NLOS in the plurality of measurement distances.

In more detail, the NLOS estimation module 62 inputs the plurality of offset compensation distances, the plurality of distance standard deviations, and the plurality of signal strengths into the neural network, and uses the plurality of corrected distances and a plurality of corrected standard deviations as outputs, so as to estimate degrees of NLOS in the plurality of FTM data records and eliminate the plurality of position-dependent errors.

On the right side of FIG. 6, the NLOS estimation module 62 is a dense neural network that predicts how much the offset distance should be corrected and the possible standard deviation of this sample. The NLOS estimation module 62 receives the $d^o$ output from the offset module 60, and the standard deviations $s_i^{FTM}$ and RSSI $r_i^{FTM}$ from the FTM data records (labeled as $S_{FTM,i}$ and $r_{FTM,i}$ in FIG. 6).

The neural network includes a flattened layer Flatten taken as an input layer, a first fully connected layer FC, 64 and a second fully connected layer FC, 32 that perform nonlinear mapping with a tanh activation function, and an output layer. The output layer includes a first output neuron L.Relu using Leaky ReLU activation function and a second output neuron ReLU using the ReLU activation function. The first output neuron L.Relu outputs the corrected distances $\hat{d}^c$, and the second output neuron ReLU outputs the corrected standard deviations $\hat{s}$. The NLOS estimation module 62 only focuses on the features related to the location, such that the subscript i is deleted from the input.

The ranging model 6 further includes a summation unit 64 for subtracting the corrected distance from the offset compensation distance $\hat{d}^o$ that has been processed by a mean operation Mean, so as to generate a plurality of to-be-optimized estimated distances. The ranging model 6 will output two values: the corrected distance $\hat{d}^c$ and the corrected standard deviation Therefore, the to-be-optimized estimated distance is:

$$\hat{d}=\hat{d}^o-\hat{d}^c.$$

The corrected distance $\hat{d}^c$ is an output of the leaky ReLU activation function, which is Leaky ReLU(x)=max(0.1×). This activation function tends to output a positive value. Such a design matches with the feature of the NLOS path that mainly causes the measured distance to become longer, and this extra corrected distance $\hat{d}^c$ will be subtracted.

Hereinafter, an optimization process for training the ranging model 6 without knowing the location of each FTMR in advance is further provided in the present disclosure. In other words, only one or a small number of known FTMR coordinates can be used to train the ranging model 6 and predict unknown coordinates of other FTMRs at the same time. Since the true distance between a measurement location and the FTMR is not provided in the optimization process, this optimization process is a semi-supervised learning process.

Assuming that training FTM data records are collected for N times in a testing field, J FTMR is received in each piece of data, and the data is measured at z (n), a prediction distance $\hat{d}_j(n)$ and a standard deviation $\hat{\sigma}_j(n)$ are generated by the ranging model for the j-th FTMR which is at $z_j$.

The distance loss is a sum of differences respectively between the plurality of measurement distances related to the at least one reference base station and the true distances, and the true distances are distances between coordinates on the mixed path and the at least one reference coordinate in response to the plurality of measurement distances being obtained.

In other words, the distance loss is defined as the difference between the true distance $\|z(n)-z_j\|$ from the measurement location to the FTMR and the distance $\hat{d}_i(n)$ predicted by the ranging model, as shown below:

$$L^{dist} = \sum_{j=1}^{J}\sum_{n=1}^{N} w(n) \cdot I(n) \left| \|z(n) - z_j\| - \hat{d}_j(n) \right|;$$

where the weight w (n)=$1/\tilde{S}_k^2$. Further, if the true coordinates for the j-th FTMR are provided, (n)=1; otherwise, (n)=0. Since reliance on more confident position markers is desired, and since the smaller the variance, the higher the confidence, a reciprocal of the calculated variance is used as the basis for calculating the weight w (n). By minimizing this loss term, the ranging model can be updated to provide a more accurate predicted distance $\hat{d}_j(n)$.

The geometric loss is a sum of differences respectively between the plurality of measurement distances and a plurality of due distances, and the plurality of due distances are distances respectively between the coordinates on the mixed path and a plurality of to-be-optimized estimated coordinates of the plurality of base stations.

In other words, the geometric loss is defined as:

$$L^{geo} = \sum_{j=1}^{J}\sum_{n=1}^{N} w(n) \cdot \left| \|z(n) - \hat{z}_j\| - \hat{d}_j(n) \right|;$$

where $\hat{z}_j$ is the predicted coordinates of the j-th FTMR, and each j is originally set at (0, 0, 0).

From the above-mentioned two loss terms, the ranging model uses the minimization of distance loss to learn how to provide an accurate distance prediction. Then, in the minimization of geometric loss, a better ranging model is used to make the unknown FTMR converge to a more probable coordinate.

Figure 7:
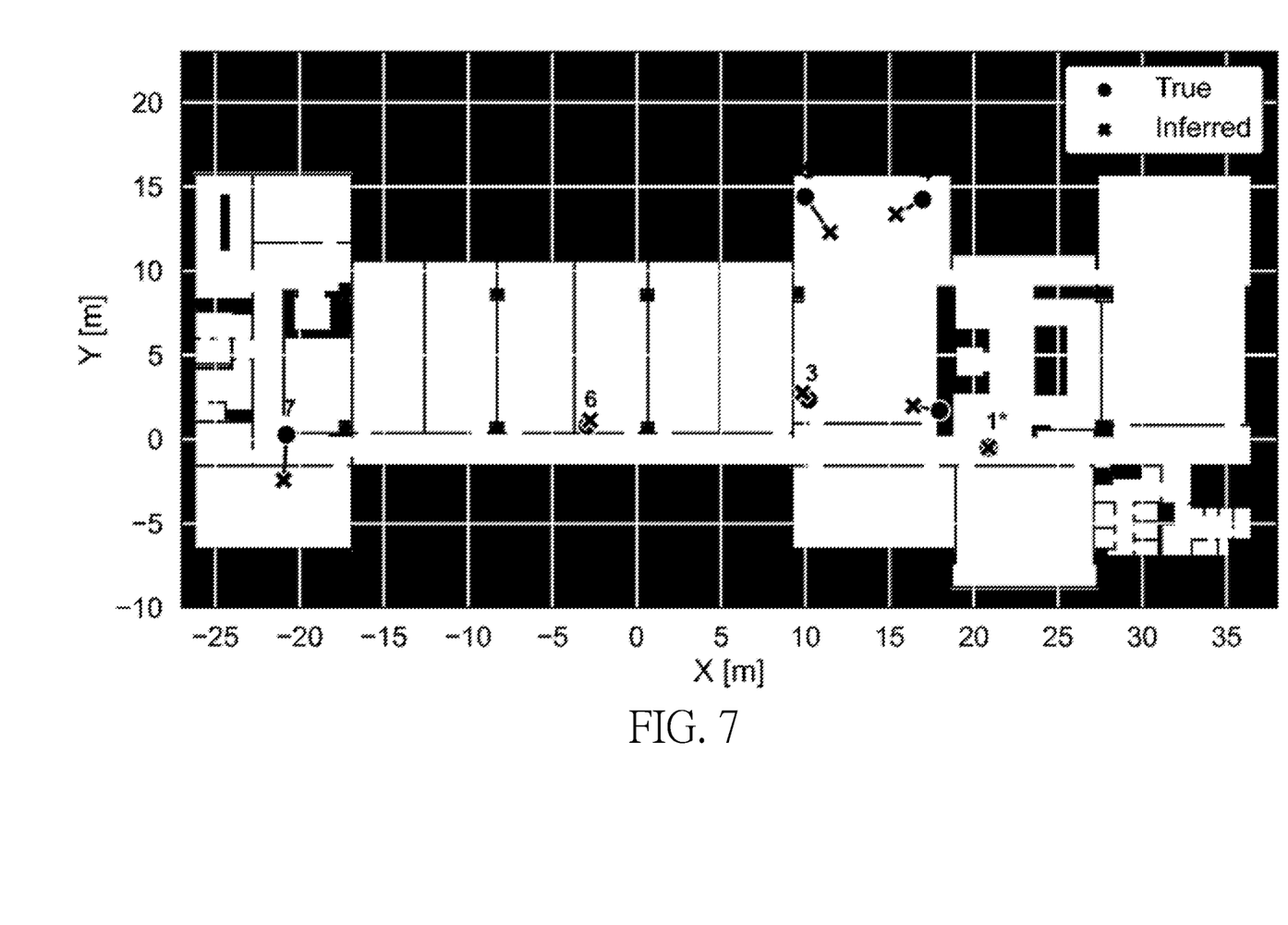
FIG. 7 is a schematic diagram of base station coordinates that are inferred by the optimized ranging model according to one embodiment of the present disclosure.

Reference is made to FIG. 7, which is a schematic diagram of base station coordinates that are inferred by the optimized ranging model according to one embodiment of the present disclosure. As shown in FIG. 7, Inferred represents a prediction result under the condition that only one FTMR position is provided, and True represents the true position of the FTMR.

A loss function related to the standard deviation prediction is defined by:

$$L^{var} = \sum_{j=1}^{J}\sum_{n=1}^{N} w(n) \cdot L_{q_1}\left( \|z(n) - \hat{z}_j\| - \hat{d}_j(n) + 2\hat{\sigma}_j(n) \right) +$$

$$\sum_{j=1}^{J}\sum_{n=1}^{N} w(n) \cdot L_{q_2}\left( \|z(n) - \hat{z}_j\| - \left(\hat{d}_j(n) + 2\hat{\sigma}_j(n)\right) \right);$$

where $L_{q1}$ and $L_{q2}$ represent quantile losses of (q1,q2)= (2.5%, 97.5%). The quantile loss $L_q$ is defined by the following equation:

$$L_q(x) = \begin{cases} qx & \text{if } x \geq 0 \\ (q-1)x & \text{otherwise} \end{cases};$$

where q is a quantile level to be predicted.

The asymmetric characteristic of the quantile loss compensates for an unbalanced number separated by a quantile value. Therefore, in a variation loss $L^{var}$, we penalize huge loss to those predictions that deviate from a supposed distance $\|z(n)-z\hat{}_j\|$ by more than two predicted standard deviations $\hat{\sigma}_j(n)$.

In this case, within the 95% confidence interval, the true distance is expected to be within two standard deviations of the predicted distance.

The ranging model includes the offset compensation module and the NLOS estimation module, both of which affect the distance prediction. However, the corrected distance is not to dominate the distance prediction. Therefore, in one embodiment of the present disclosure, a loss term is further added, so as to consider a length of a correction distance ay (n) as a loss:

$$L_{corr} = \sqrt{\sum_{j=1}^{J}\sum_{n=1}^{N} w(n)\hat{a}_j^2(n)^2}.$$

All the loss terms can be added as a unified loss:

$$L = \lambda_1 L^{dist} + \lambda_2 L^{geo} + \lambda_3 L^{var} + \lambda_4 L^{corr};$$

where $(\lambda_1,\lambda_2,\lambda_3,\lambda_4)=(1,1,1,0.1)$ is a constant that can control the balance among all the loss terms.

For the unknown FTMR coordinate Zj and the parameters $\Theta$ of the to-be-optimized ranging model, the training process of iteratively minimizing the unified loss L and updating the variables through gradient descent is as follows:

$$\hat{z}_j \leftarrow \hat{z}_j - \alpha_1 \frac{\partial L}{\partial \hat{z}_j};$$
$$\Theta \leftarrow \Theta - \alpha_2 \frac{\partial L}{\partial \Theta}$$

where $(\alpha_1,\alpha_2)=(0.1,0.001)$ is a learning rate, and gradients $\partial L/\hat{z}_j$ and $\partial L/\partial \Theta$ are provided by a back propagation algorithm.

Reference is made to FIG. 2 again. After the ranging model is optimized by the optimization process, the ranging-type positioning method further includes configuring the computing device 12 to carry out the following steps.

Step S207: generating the plurality of estimated distances, calculating a plurality of estimated coordinates of the base stations according to the plurality of estimated distances, and taking the optimized ranging model as a positioning model.

In the following description, a positioning stage is entered.

Step S208: configuring a to-be-positioned mobile device to move in the target field, obtain positioning direction information and positioning step length information during a movement of the to-be-positioned mobile device, and communicate with the plurality of base stations to collect a plurality of positioning measurement data records related to the plurality of base stations during the movement.

After step S208, the computing device 12 is further configured to perform:

Step S209: calculating a plurality of positioning measurement distances and a plurality of positioning measurement parameters related to the plurality of positioning measurement distances according to the plurality of positioning measurement data records;

Step S210: inputting the plurality of positioning measurement distances and the plurality of positioning measurement parameters into the positioning model to generate a plurality of positioning estimated distances; and Step S211: executing the particle filter to obtain a position of the to-be-positioned mobile device in the target field according to the map information, the positioning direction data, the positioning step length data, the estimated coordinates and the positioning estimated distances.

In the positioning stage, the corrected FTMR ranging model can be used as a reliable ranging source to update the user's location. Even though the loss minimization process mentioned above can provide accurate results, the iterative process is not suitable for an online positioning phase; otherwise, a positioning time may be too long. In addition, in the above minimization steps it is difficult to incorporate IMU sensor information. Therefore, in the positioning stage, the PF is again used as a non-linear filter to capture the position of the to-be-positioned mobile device 13, and the IMU readings and the FTM data records are fused to update the weight of the particles.

Reference is made to Table 1 below, which shows the positioning errors of different positioning methods (including a weighted-least-square (WLS) positioning method, the PDR and the ranging-type positioning method of the present disclosure). The ranging-type positioning method of the present disclosure is significantly better than the WLS and the PDR, and the positioning error can be reduced to less than 0.75 m. Compared with the WLS, the ranging-type positioning method of the present disclosure improves the positioning error by about 43%.

TABLE I

| Method | mean error (m) | 90% (m) | Improvement (compared with WLS) |
|---|---|---|---|
| PDR | 1.09 | 1.91 | — |
| WLS | 1.23 | 2.02 | — |
| Ranging-type positioning method of the present disclosure | 0.75 | 1.15 | 43% |

In conclusion, in the positioning stage, the position of the to-be-positioned mobile device can be positioned by having the ranging model operated in cooperation with the PDR and the PF. In situations where the true position of the uncalibrated FTMR base station cannot be obtained, the ranging-type positioning system and the ranging-type positioning method of the present disclosure allow the positioning accuracy of the inversely inferred positions of the base stations based on crowdsourced data to remain unchanged.

In the positioning stage, not only is the PDR used to update the position of the to-be-positioned mobile device 13, but the optimized ranging model 6 also provides the predicted ranging result and the corresponding FTMR position, such that the PF can update the weight of each particle according to the probability. In this way, the user's position can be quickly captured by the PDR, so as to obtain short-term local characteristics. In addition, drifting of global satellite positioning results can be avoided due to limitations of the FTM data records, such that the positioning results can be accurate and stable.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A ranging-type positioning method based on crowdsourced calibration, comprising:
arranging a plurality of base stations in a target field;
configuring a mobile device to move in the target field for obtaining direction information and step length information during a movement of the mobile device, and configuring the mobile device to communicate with the plurality of base stations for collecting a plurality of measurement data records related to the plurality of base stations during the movement;
configuring a computing device to:
    calculate, according to the plurality of measurement data records, a plurality of measurement distances and a plurality of measurement parameters related to the plurality of measurement distances;
    obtain map information of the target field, wherein the map information includes at least one reference coordinate of at least one reference base station among the plurality of base stations;
    execute a particle filter for obtaining a forward path, a backward path and a replay path according to the map information, the direction information and the step length information;
    combine the backward path and the replay path for generating a mixed path;
    perform an optimization process on a ranging model, so as to minimize a distance loss and a geometric loss with respect to one of a plurality of estimated distances generated by the ranging model, wherein the ranging model includes:
        an offset compensation module configured to process the plurality of measurement distances through a first activation function and generate a plurality of offset compensation distances, wherein the plurality of offset compensation distances are respectively used to eliminate a plurality of offset errors of the plurality of measurement distances; and a non-line of sight (NLOS) estimation module configured to, by using a neural network, take the plurality of offset compensation distances and the plurality of measurement parameters as inputs and estimate a plurality of corrected distances, wherein the plurality of corrected distances are used to eliminate a plurality of position-dependent errors caused by NLOS in the plurality of measurement distances;

wherein the distance loss is a sum of differences respectively between the plurality of measurement distances related to the at least one reference base station and a plurality of true distances, and the plurality of true distances are distances between coordinates on the mixed path and the at least one reference coordinate in response to the plurality of measurement distances being obtained;

wherein the geometric loss is a sum of differences respectively between the plurality of measurement distances and a plurality of due distances, and the plurality of due distances are distances respectively between the coordinates on the mixed path and a plurality of to-be-optimized estimated coordinates of the plurality of base stations in response to the plurality of measurement distances being obtained; and generate, in response to the ranging model being optimized by the optimization process, the plurality of estimated distances, calculate a plurality of estimated coordinates of the base stations according to the plurality of estimated distances, and take the optimized ranging model as a positioning model;

configuring a to-be-positioned mobile device to move in the target field, to obtain positioning direction information and positioning step length information during a movement of the to-be-positioned mobile device, and to communicate with the plurality of base stations for collecting a plurality of positioning measurement data records related to the plurality of base stations during the movement; and configuring the computing device to:
calculate, according to the plurality of positioning measurement data records, a plurality of positioning measurement distances and a plurality of positioning measurement parameters related to the plurality of positioning measurement distances;
input the plurality of positioning measurement distances and the plurality of positioning measurement parameters into the positioning model, so as to generate a plurality of positioning estimated distances; and
execute, according to the map information, the positioning direction information, the positioning step length information, the estimated coordinates and the positioning estimated distances, the particle filter to obtain a position of the to-be-positioned mobile device in the target field.

2. The ranging-type positioning method according to claim 1, wherein the mobile device includes a plurality of inertial measurement units for obtaining the direction information and the step length information.

3. The ranging-type positioning method according to claim 1, wherein in the step of configuring the mobile device to move in the target field, the mobile device is carried by a user, so as to move in the target field along a predetermined route.

4. The ranging-type positioning method according to claim 1, wherein the base stations are a plurality of WI-FI access points, and the step of configuring the mobile device to communicate with the plurality of base stations for collecting the plurality of measurement data records related to the plurality of base stations during the movement includes:
configuring the mobile device as a fine time measurement (FTM) initiator to communicate with the plurality of WI-FI access points that are taken as a plurality of FTM responders, so as to activate an FTM protocol and take a plurality of FTM data records collected from the plurality of Wi-Fi access points during the movement of the mobile device as the plurality of measurement data records.

5. The ranging-type positioning method according to claim 4, wherein the step of configuring the computing device to calculate the plurality of measurement distances and the plurality of measurement parameters related to the plurality of measurement distances according to the plurality of measurement data records includes:
configuring the computing device to calculate, according to the plurality of FTM data records, a plurality of FTM distances and the plurality of measurement parameters of the Wi-Fi access points measured by the mobile device during the movement, wherein the plurality of measurement parameters include a plurality of distance standard deviations and a plurality of signal strengths, and the plurality of FTM distances include the plurality of offset errors, the plurality of position-dependent errors, and a plurality of measurement errors.

6. The ranging-type positioning method according to claim 1, wherein the map information defines an accessible area and an inaccessible area according to a plurality of wall structures in the target field.

7. The ranging-type positioning method according to claim 1, wherein the step of configuring the computing device to execute the particle filter for obtaining the forward path, the backward path and the replay path according to the map information, the direction information and the step length information includes:
configuring the computing device to execute the particle filter for:
performing a forward process to gradually filter a plurality of first simulation particles set in the target field, so as to obtain the forward path and a first end point according to the map information, and the direction information and the step length information of the mobile device during the movement;
performing a backward process to process the direction information and the step length information and generate backward direction information and backward step length information, to use the first end point as a starting point of the backward process, and to gradually filter a plurality of second simulation particles set in the target field, so as to obtain the backward path and a second end point according to the map information, and the backward direction information and the backward step length information of the mobile device during the movement; and
performing a replay process to take the second end point as another starting point and gradually filter a plurality of third simulation particles set in the target field, so as to obtain the replay path according to the map information, and the direction information and the step length information of the mobile device during the movement.

8. The ranging-type positioning method according to claim 7, wherein the step of configuring the computing device to combine the backward path and the replay path for generating the mixed path includes:
  configuring the computing device to perform an inverse variance weighting method, so as to combine the backward path and the replay path and generate the mixed path, wherein the mixed path defines a plurality of path coordinates in the map information at each step of the mobile device during the movement.

9. The ranging-type positioning method according to claim 5, wherein the first activation function is a rectified linear unit (ReLU) activation function,
  wherein the offset compensation module is configured to take the plurality of FTM distances as inputs, add a plurality of offset variables respectively to the plurality of FTM distances, and use the ReLU activation function to calculate, so as to generate the plurality of offset compensation distances for eliminating the plurality of offset errors of the plurality of FTM distances,
  wherein the NLOS estimation module is configured to input the plurality of offset compensation distances, the plurality of distance standard deviations, and the plurality of signal strengths into the neural network, and use the plurality of corrected distances and a plurality of corrected standard deviations as outputs, so as to estimate degrees of NLOS in the plurality of FTM data records and eliminate the plurality of position-dependent errors, and
  wherein the ranging model further includes a summation unit, which is configured to subtract the plurality of corrected distances respectively from the plurality of offset compensation distances, so as to generate a plurality of to-be-optimized estimated distances.

10. The ranging-type positioning method according to claim 9, wherein the neural network of the NLOS estimation module includes:
  a flattened layer taken as an input layer;
  a first fully connected layer that performs nonlinear mapping with a tanh activation function;
  a second fully connected layer that performs the nonlinear mapping with the tanh activation function; and
  an output layer that includes a first output neuron using a Leaky ReLU activation function and a second output neuron using the ReLU activation function;
  wherein the first output neuron outputs the plurality of corrected distances, and the second output neuron outputs the plurality of corrected standard deviations.

11. A ranging-type positioning system based on crowd-sourced calibration, comprising:
  a plurality of base stations arranged in a target field;
  a mobile device, wherein the mobile device is configured to move in the target field for obtaining direction information and step length information during a movement of the mobile device, and the mobile device is configured to communicate with the plurality of base stations for collecting a plurality of measurement data records related to the plurality of base stations during the movement;
  a computing device configured to:
    calculate, according to the plurality of measurement data records, a plurality of measurement distances and a plurality of measurement parameters related to the plurality of measurement distances;
    obtain map information of the target field, wherein the map information includes at least one reference coordinate of at least one reference base station among the plurality of base stations;
    execute a particle filter for obtaining a forward path, a backward path and a replay path according to the map information, the direction information and the step length information;
    combine the backward path and the replay path for generating a mixed path;
    perform an optimization process on a ranging model, so as to minimize a distance loss and a geometric loss with respect to one of a plurality of estimated distances generated by the ranging model, wherein the ranging model includes:
      an offset compensation module configured to process the plurality of measurement distances through a first activation function and generate a plurality of offset compensation distances, wherein the plurality of offset compensation distances are used to eliminate a plurality of offset errors of the plurality of measurement distances, respectively; and
      a non-line of sight (NLOS) estimation module configured to, by using a neural network, take the plurality of offset compensation distances and the plurality of measurement parameters as inputs, and estimate a plurality of corrected distances, wherein the plurality of corrected distances are used to eliminate a plurality of position-dependent errors caused by NLOS in the plurality of measurement distances,
      wherein, the distance loss is a sum of differences respectively between the plurality of measurement distances related to the at least one reference base station and a plurality of true distances, and the plurality of true distances are distances between coordinates on the mixed path and the at least one reference coordinate in response to the plurality of measurement distances being obtained,
      wherein, the geometric loss is a sum of differences respectively between the plurality of measurement distances and a plurality of due distances, and the plurality of due distances are distances respectively between the coordinates on the mixed path and a plurality of to-be-optimized estimated coordinates of the plurality of base stations in response to the plurality of measurement distances being obtained; and
    generate, in response to the ranging model being optimized by the optimization process, the plurality of estimated distances, calculate a plurality of estimated coordinates of the base stations according to the plurality of estimated distances, and take the optimized ranging model as a positioning model; and
  a to-be-positioned mobile device configured to move in the target field, to obtain positioning direction information and positioning step length information during a movement of the to-be-positioned mobile device, wherein the to-be-positioned mobile device is configured to communicate with the plurality of base stations for collecting a plurality of positioning measurement data records related to the plurality of base stations during the movement;
  wherein the computing device is further configured to:
    calculate, according to the plurality of positioning measurement data records, a plurality of positioning measurement distances and a plurality of positioning measurement parameters related to the plurality of positioning measurement distances;
    input the plurality of positioning measurement distances and the plurality of positioning measurement parameters into the positioning model, so as to generate a plurality of positioning estimated distances; and execute, according to the map information, the positioning direction data, the positioning step length data, the estimated coordinates and the positioning estimated distances, the particle filter to obtain a position of the to-be-positioned mobile device in the target field.

* * * * *